Feb. 15, 1927.  
J. B. SINEATH  
HEADLIGHT  
Filed Jan. 25, 1926     2 Sheets-Sheet 1  
1,617,463

J. B. Sineath, INVENTOR

BY Victor J. Evans
ATTORNEY

WITNESS: P. J. Hickey

Feb. 15, 1927.
J. B. SINEATH
HEADLIGHT
Filed Jan. 25, 1926
1,617,463
2 Sheets-Sheet 2
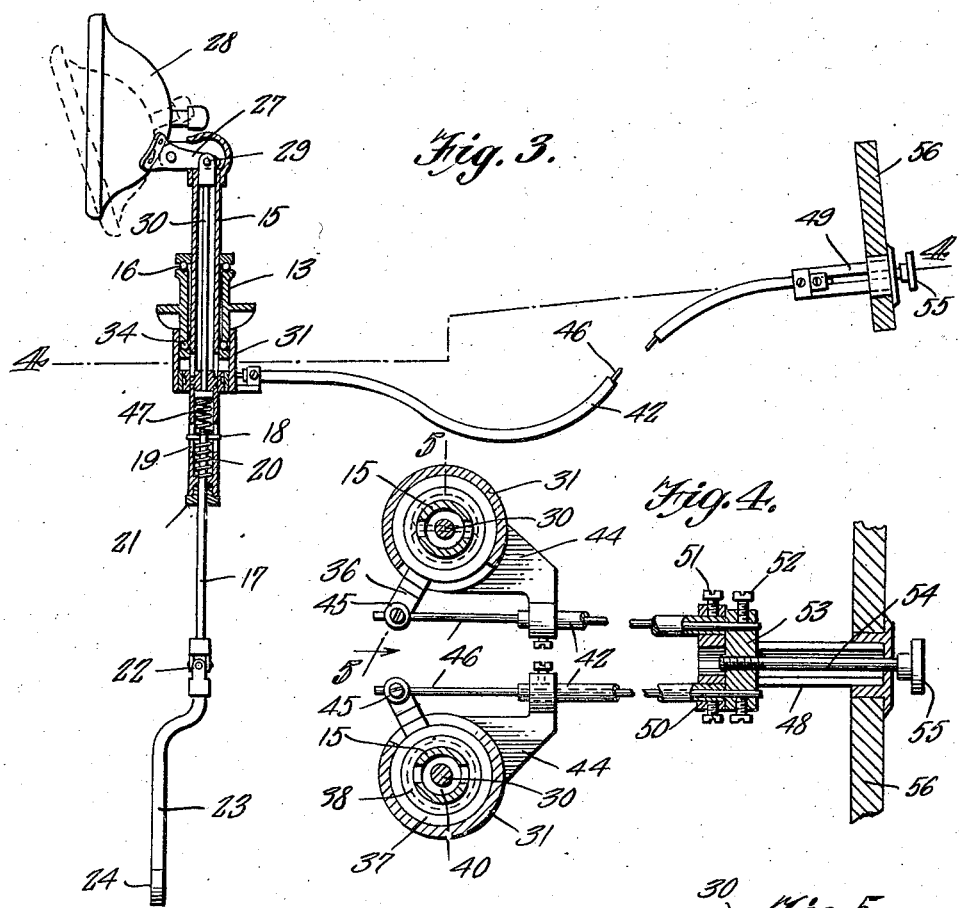
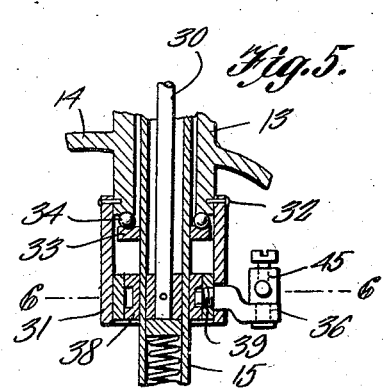
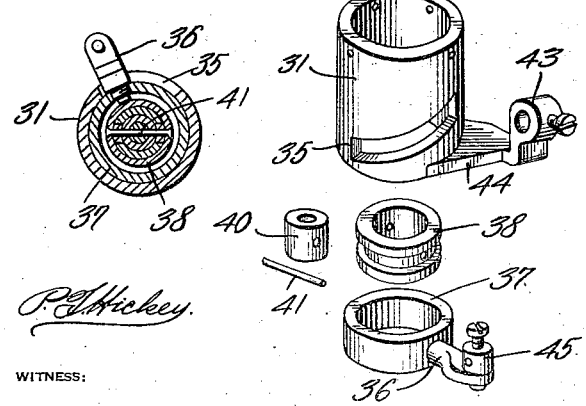
J. B. Sineath,
INVENTOR
BY Victor J. Evans
ATTORNEY
P. J. Hickey.
WITNESS:

Patented Feb. 15, 1927.

1,617,463

UNITED STATES PATENT OFFICE.

JULIUS B. SINEATH, OF ORANGEBURG, SOUTH CAROLINA.

HEADLIGHT.

Application filed January 25, 1926. Serial No. 83,667.

The cardinal object of the invention resides in the provision of means for simultaneously turning a headlight in the direction of travel incident to the operation of the steering wheels of a vehicle whereby the roadway around the curves and bends in roadways may be illuminated.

Another object of my invention resides in the provision of manually operated means associated with the headlamps for facilitating the tilting in order that the usual glaring effect may be obliterated to approaching motorists.

With the above and other objects in view, the invention further includes the following novel features and details of construction, to be hereinafter more fully described, illustrated in the accompanying drawings and pointed out in the appended claims.

In the drawing:—

Figure 3 is a fragmentary side elevation of my invention per se.

Figure 4 is a sectional view taken on line 4—4 of Figure 3.

Figure 5 is a sectional view taken on line 5—5 of Figure 4.

Figure 6 is a transverse section taken on line 6—6 of Figure 5.

Figure 7 is a perspective view of the elements so forming the tilting apparatus.

Figure 1:
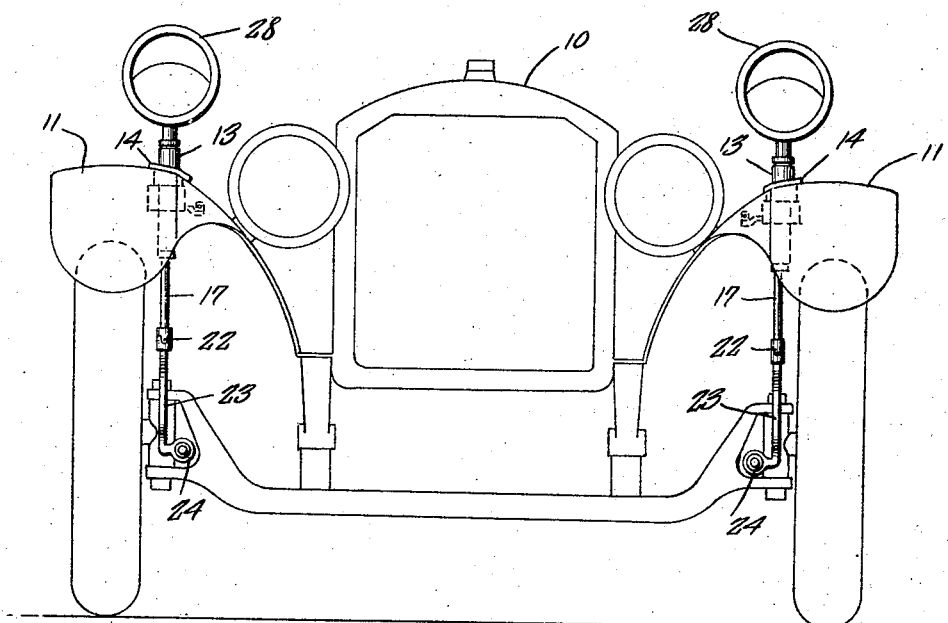
Figure 1 is a front elevation of the motor vehicle showing my present invention applied thereto.
Figure 2:
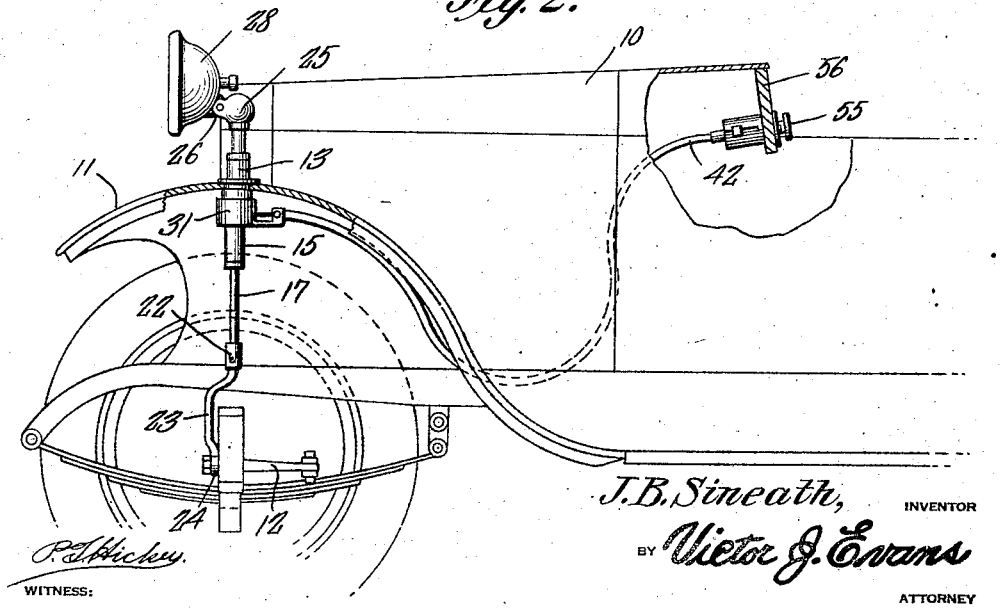
Figure 2 is a fragmentary side elevation of a motor vehicle illustrating the manner in which the turning and tilting apparatus is associated therewith.

Referring to the drawings in detail, wherein like characters of reference denote corresponding parts, the reference character 10 indicates a motor vehicle, 11 the front fenders and 12 the spindle arms, all of the above being of the usual well known construction and forming no part of the present application for Letters Patent but being merely shown for purposes of illustration in bringing forward the novel advantages of the above entitled invention.

The invention resides in the provision of a sleeve 13 having an obliquely disposed outwardly extending annular flange 14 for engagement with the upper side of the front fenders 11 of the motor vehicle 10 with the sleeves 13 inserted within the openings provided therein. A tubular member 15 is mounted within the sleeve 13 and provided with anti-friction bearings as indicated at 16 and extending outwardly an appreciable distance from the opposite ends of the sleeve 13. The lower end of the sleeve 13 extends upwardly within the lower end of the tubular member 15 for a rod 17 having a pin 18 extending outwardly an appreciable distance upon its opposite sides and adapted for reciprocation within slotted portions 19 provided at diametrically opposite sides of the tubular member 15. A compression spring 20 is positioned between the under side of the pin 18 and wholly within the lower end of the tubular member 15 through the instrumentality of a backing gland or a nut 21. The lower end of the rod 17 has a universal joint 22 associated therewith and in turn connected with an offset and downwardly extending rod 23 having an enlarged apertured portion and provided upon its lower end and extending transversely with respect thereto in order that it may be pivotally associated with the forward end of the vehicle spindle arm 12. It will thus be noted from the foregoing description and accompanying drawings that the successful turning of the vehicle wheels and spindle arms 12 will automatically and simultaneously turn the tubular member 15 in the same direction.

In order to provide means for mounting a headlamp upon the upper free ends of the tubular members 15 I provide dome-shaped members 25 having outwardly and forwardly extending apertured ears 26 thereon for pivotally associated inwardly extending bracket arms 27 provided upon the inner sides of the motor vehicle headlamps 28. The inner free ends of the brackets 27 are pivotally associated as indicated at 29 to the upper free ends of the vertically disposed rods 30 arranged within the tubular members 15.

An enlarged sleeve 31 is associated or connected as indicated at 32 to the lower end of the sleeve 13 being rigidly associated as indicated at 32 while the tubular member 15 at this juncture has an annular flange 33 thereon for interposing ball bearings 34 between the lower free end of the sleeve 13 and upper side of the annular flange 33 whereby the said tubular member 15 may be freely rotated within the sleeve 13.

The sleeve 31 has an inclined slotted portion 35 provided therein adjacent its lower periphery to permit an arm 36 to protrude therethrough when associated with a collar 37 positioned within the sleeve 31 and which collar 37 has a grooved collar 38 positioned therein while a lug portion 39 provided upon the inner end of the arm 36 extends an appreciable distance within the groove of the collar 28, the purpose of which will be presently apparent.

The grooved collar 38 receives the tubular member 15 therethrough while the apertured sleeve 40 is shaped within the tubular member 15 and receives the lower end of the vertically disposed rod 30 therein after which a pin 41 is inserted within the vertically disposed rod 30 and sleeve 40 and tubular member 15 in order that these elements may be held rigidly as one.

Controlling means to facilitate tilting of the motor vehicle headlamp 28 is provided by securing the forward end of a flangible tube 42 within a sleeve-like member 43 provided upon the extremity of an arm 44 which extends from the periphery of the sleeve 31 while an adjustably pivotally mounted block 45 is arranged upon the inner end of the arm 36 whereby the forward end of a capital Bowden wire 46 is associated therewith. The said collar 37 when locked within the sleeve 31 will have its arm 36 inserted within the inclined slotted portion 35 in the sleeve whereby the same will be caused to lock and owing to the provision of the lug 39 provided upon its elements associated therewith through the instrumentality of the pin 41 will be caused to move upwardly and downwardly whereby the motor vehicle headlamp 28 may be tilted at a desired inclination. A compression spring 47 is interposed between the upper sides of the pin 18 and under side of the apertured sleeve 40 in order that the pin 18 will be held centrally within the slotted portions 19 in the tubular member 15 and the tilting apparatus held against vibratory movement and consequently eliminates rattles at this juncture.

The operating means consist in the provision of a tubular member 48 having longitudinally disposed slotted portions 49 provided therein while a block 50 is formed upon its inner end and has openings therein for the reception of the inner ends of the flangible tubing 42 which is held therein through the instrumentality of the set screw 51 while the wires 46 are received within openings and held secured therein through the instrumentality of like fastening elements 52 arranged within the opposite ends of a block 53 mounted for sliding movements within the longitudinally disposed slotted portions 49 provided in the tubular member 48 which block 53 is secured to the forward end of a shaft 54 extending within the tubular member 48 and has a knob 55 upon the inner side of the motor vehicle instrument bottom 56 within convenient reach of the motor vehicle operator whereby the motor vehicle headlamp 28 may be readily and easily tilted at those inclinations desired by the respective motorists.

The invention is susceptible of various changes in its form, proportions and minor details of construction, and the right is herein reserved to make such changes as properly fall within the scope of the appended claims.

Having thus described the invention, what is claimed is:—

1. In a device of the character described, a bearing sleeve, a tubular member extending upwardly through the bearing sleeve, a headed light pivotally supported at the upper end of the sleeve, a rod extending through the sleeve and operatively connected with the head light, an enlarged sleeve attached to the lower end of the bearing sleeve, a groove collar in the second sleeve surrounding the tubular member, a second collar in the enlarged sleeve surrounding the groove collar, said second collar, groove collar, tubular member and rod being connected for simultaneous movement, said enlarged sleeve having an inclined slot therein, an arm extending through the slot and secured to the second collar with a portion thereof extending into the groove of the first collar and means connected with said arm for imparting reciprocating movement thereto causing the same to move within the inclined slot and receiving the rod for imparting tilting movement to the lamp.

2. Head light operating means including a tube having oppositely disposed slots therein, a block attached to the outer end of said tube, a second block movable in the sleeve and having portions projecting through the slots, means connecting the second block with said light members and a shaft mounted for reciprocating movement within the sleeve and having connection with the second block for imparting movement thereto.

In testimony whereof I affix my signature.

JULIUS B. SINEATH.